3,080,439
Patented Mar. 5, 1963

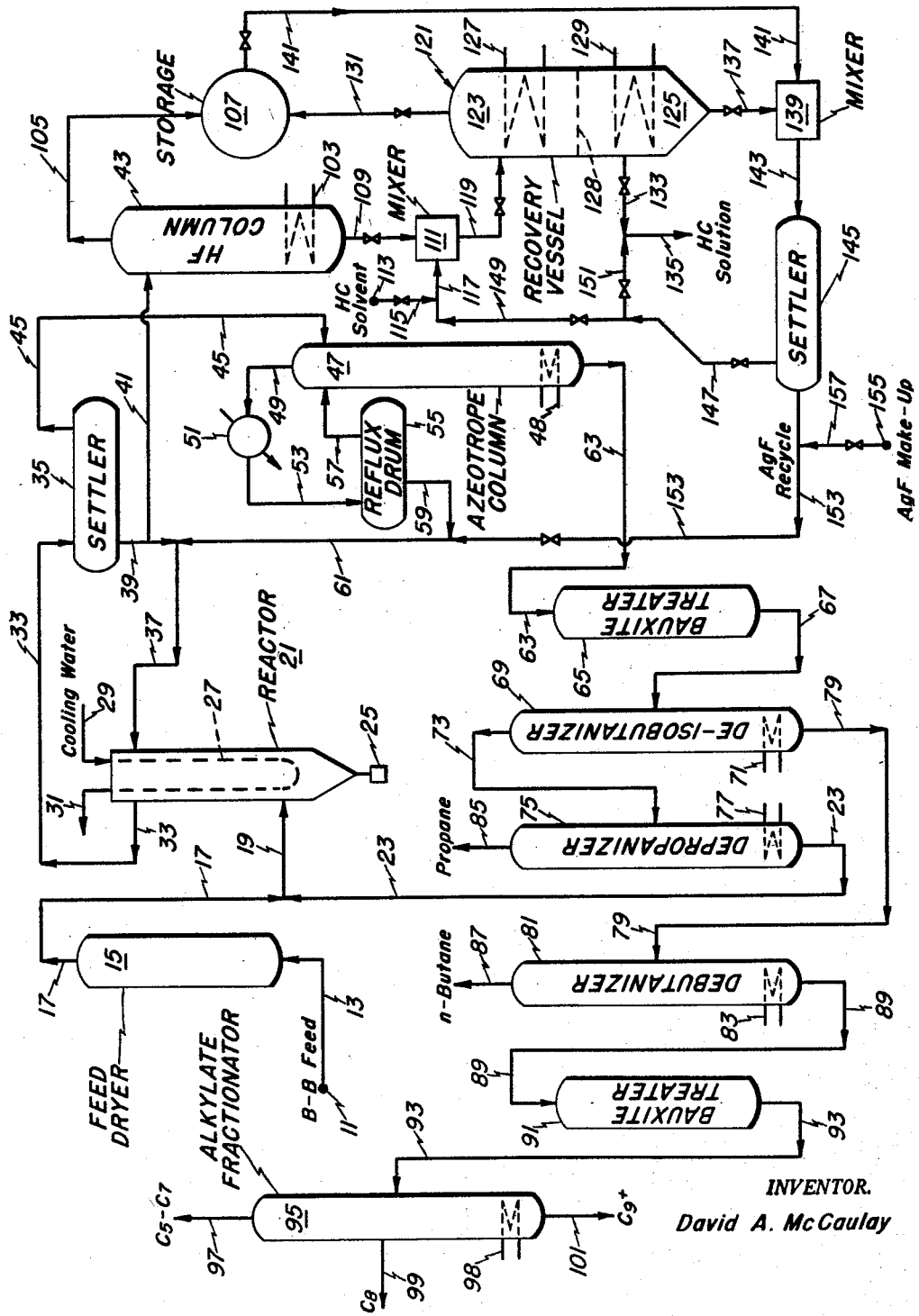

3,080,439
PARAFFIN ALKYLATION PROCESS USING A HYDROGEN FLUORIDE-SILVER FLUORIDE CATALYST SOLUTION
David A. McCaulay, Homewood, Ill., assignor to Standard Oil Company, Chicago, Ill., a corporation of Indiana
Filed June 23, 1961, Ser. No. 119,224
11 Claims. (Cl. 260—683.51)

This invention relates to the alkylation of isoparaffins and olefins using a modified hydrogen fluoride catalyst.

Paraffin alkylation processes using a hydrogen fluoride catalyst have been used for some years in the petroleum industry. These processes do not produce an alkylate with as high an octane number as the industry would like; also these processes produce too large a portion of the alkylate boiling outside of the $C_8$ range; and these processes produce too much of the low octane $C_8$'s. In an attempt to overcome these problems, the industry has investigated HF catalyst using modifiers.

One object of this invention is to produce a higher octane paraffin alkylate using an HF catalyst. Another object is to decrease the portion of the alkylate falling outside the $C_8$ range when using an HF catalyst. Still another object is to increase the high octane $C_8$'s of the $C_8$ portion of the alkylate when using an HF catalyst. Other objects of this invention will become evident during the detailed description of the invention.

The annexed FIGURE which forms a part of this specification sets out one illustrative embodiment of the process of the invention.

It has been discovered that the above objects are obtained when a liquid hydrogen fluoride catalyst is modified by the addition of the hereinafter described amounts of silver fluoride. This modified catalyst is used in an alkylation process in which isoparaffins having 4–5 carbon atoms and olefins having 3–5 carbon atoms are reacted together at a temperature on the order of 30°–130° F.

The reactants charged to the reactor in the process of the invention are isoparaffins having 4–5 carbon atoms and olefins having 3–5 carbon atoms. Illustrative compounds are isobutane, isopentane, propylene, butene-1, butene-2, isobutylene and pentene-1. The hydrocarbon feed to the process may contain in addition to the defined isoparaffins and olefins, inert hydrocarbons such as n-butane and n-pentane. The process can utilize a mixture of isoparaffins and/or a mixture of olefins. Particularly suitable is a refinery butane-butylene stream; this stream contains n-butane, isobutane and the $C_4$ olefins isomers and may contain some $C_3$ and $C_5$ hydrocarbons. Sulfur compounds in the feed react with the silver fluoride, and therefore, it is preferred to remove any sulfur compounds from the feed before charging the feed to the process.

The isoparaffins and olefins are present in the reaction zone in the mole ratio of isoparaffin to olefins of at least 2. Preferably, this ratio is higher and may be 100 and even more. Ratios in the order of 1,000 may be obtained by multi-point olefin injection. It is preferred that the ratio used be about 4–10.

The catalyst used in the process is liquid substantially anhydrous hydrogen fluoride. The substantially anhydrous hydrogen fluoride may contain as much as 3% water. It is preferred to operate with anhydrous hydrogen fluoride containing 1% or less water.

The hydrogen fluoride catalyst is modified by the presence of dissolved silver fluoride. The catalyst solution contains about 2–15 parts by weight of silver fluoride per 100 parts by weight of hydrogen fluoride. The amount of silver fluoride present in the catalyst solution has an influence on the octane number of the alkylate product; higher octane numbers are obtained when using silver fluoride in an amount of about 5–12 parts by weight per 100 parts by weight of hydrogen fluoride. When operating with isobutane and 4 carbon olefins as the feed to the process, it is preferred that silver fluoride be present in an amount of about 9 parts by weight per 100 parts by weight of hydrogen fluoride.

The catalyst solution and the hydrocarbon feed are present in the reaction zone in a volume ratio of at least 0.6—in other words, at least 6 parts of catalyst solution per 10 parts of feed. Usually more catalyst solution is used and preferably a volume ratio of about 1–3 is present in the reaction zone.

The process is carried out using liquid feed and liquid catalyst. The process is carried out under sufficient pressure to keep the feed and the catalyst in the liquid state.

The hydrocarbon feed and catalyst solution must be contacted together in the reaction zone to obtain the desired alkylate product. This contacting may be obtained by any one of the procedures known to those skilled in this art.

The alkylation reaction is carried out at a temperature of about 30°–130° F. The reaction can be carried out at slightly higher temperatures and slightly lower temperatures. It has been observed that this reaction is not temperature sensitive with respect to octane number of the product. Therefore, ordinary ambient temperatures on the order of 60°–80° F. may be used.

The reactants are contacted with the catalyst solution in the reaction zone for a time sufficient to obtain an alkylate product. It is preferred that this time be such to substantially convert all of the olefin to alkylate.

A mixture of hydrocarbons and catalyst solution is removed from the reactor. This mixture is composed of a liquid hydrocarbon phase and a liquid catalyst solution phase. The liquid hydrocarbon phase contains alkylate product and unreacted feed hydrocarbons. Separation of the liquid hydrocarbon phase from the liquid catalyst solution phase may be obtained by gravity separation or other means known to those skilled in this art.

The alkylate product is recovered from the hydrocarbon phase using distillation or other methods known to those skilled in this art.

One illustrative embodiment of this invention is described in connection with the figure. It is to be understood that the figure is schematic in nature and does not contain many items of equipment such as pumps and valves because these items can be supplied by those skilled in this art.

The feed to this embodiment of the invention is a refinery B-B stream containing no $C_3$ or $C_5$ hydrocarbons. The B-B feed is supplied from source 11 and passed by way of line 13 to feed drier 15. The drying operation is necessary to the control of the water content of the B-B stream in order to avoid dilution of the HF catalyst. The feed drying operation may be any conventional procedure but in this instance the feed drier is a conventional bauxite operation. The dried feed is passed by way of line 17 and line 19 to reactor 21. Recycle isobutane is also introduced to reactor 21 by way of lines 23 and 19.

Reactor 21 hereunder shown as a vertical contacting vessel is provided with an agitator (not shown) driven by motor 25 and internal heat exchanger 27. The alkylation reaction is exothermic and in order to control temperature within the reactor cooling water is passed by way of line 29 through heat exchanger 27 and withdrawn by way of line 31. The reactor effluent comprising catalyst solution, alkylate product and unreacted hydrocarbons is withdrawn by way of line 33 and passed to settler 35.

The catalyst solution is introduced to reactor 21 by way of line 37. The catalyst solution in line 37 comprises liquid HF catalyst with dissolved silver fluoride and some red oil. In general the red oil in the catalyst solution will be from 1–4%. Typically the red oil will be 2% or less of the catalyst solution. In this embodiment the red oil is controlled to about 1%.

In this embodiment the conditions within reactor 21 are as follows: the ratio of isobutane to $C_4$ olefins about 6; the ratio of catalyst solution to hydrocarbon feed about 1.5; the silver fluoride content of the catalyst solution about 9 parts by weight per 100 parts of hydrogen fluoride; the water content of the hydrogen fluoride catalyst about 0.5; the temperature of the reactor contents about 80° F.

The contents of settler 35 separate into an upper liquid hydrocarbon phase containing the alkylate product and a lower catalyst solution phase. The liquid hydrocarbon phase contains dissolved HF and usually some occluded catalyst phase material. The liquid catalyst phase solution is withdrawn from settler 35 by way of line 39. Most of the catalyst solution is passed by way of line 37 back to reactor 21. The remainder is passed by way of line 41 to HF column 43 where the regeneration of HF—AgF catalyst solution is begun.

The upper hydrocarbon phase is removed by way of line 45 and passed to column 47. Column 47 has within it reboiler 48. The overhead from column 47 is passed by way of line 49, condenser 51, line 53 to reflux drum 55. The overhead stream is composed of a mixture of HF and hydrocarbons. Then in reflux drum 55 this mixture separates into an upper hydrocarbon phase and a lower HF phase. The upper hydrocarbon phase is returned to column 47 by way of line 57 to act as a reflux stream. The lower HF phase is withdrawn from reflux drum 55 by way of line 59 and returned to reactor 21 by way of lines 61 and 37.

The bottoms from column 47 are withdrawn by way of line 63 and passed to treater 65. This stream contains dissolved fluorine compounds which have to be removed in order to obtain the desired alkylate product quality. Procedures for removing the fluorine compounds are known to those skilled in this art. In this instance bauxite treater 65 is used for the removal.

The defluorinated stream from bauxite treater 65 is passed by way of line 67 to deisobutanizer tower 69, which is provided with reboiler 71. The overhead from tower 69 which is composed of propane and lighter hydrocarbons and isobutane is passed by way of line 73 to depropanizer tower 75 which is provided with reboiler 77. The bottoms stream from tower 69 is withdrawn and passed by way of line 79 to debutanizer tower 81 which is provided with reboiler 83.

Propane and lighter hydrocarbons are withdrawn overhead from depropanizer tower 75 by way of line 85 and removed from the process. Isobutane is withdrawn from the bottom of tower 75 by way of line 23 and returned as a recycle stream through line 19 to reactor 21.

Normal butane is withdrawn overhead from debutanizer tower 81 by way of line 87 and removed from the process. Alkylate product is withdrawn from the bottom of debutanizer tower 81 and passed by way of line 89 to bauxite treater 91. In order to be certain that all of the fluorine compounds in the alkylate product are removed bauxite treater 91 is provided. Bauxite treater 91 operates in the same manner and for the same purpose as bauxite treater 65.

The defluorinated alkylate product is withdrawn from bauxite treater 91 by way of line 93 and passed to alkylate fractionator 95 which is provided with reboiler 98. Methods of separating the $C_8$'s in the alkylate product are known. In this embodiment the $C_5$-$C_7$ fraction in the alkylate product is withdrawn overhead from fractionator 95 by way of line 97. The $C_8$ fraction of the alkylate product is withdrawn by way of line 99 and the $C_9$ plus fraction is withdrawn from the bottom of fractionator 95 by way of line 101.

The regeneration of the HF catalyst solution is begun in column 43 which is provided with reboiler 103. Sufficient HF is removed from the contents of column 43 by way of overhead line 105 to obtain a concentrated solution of AgF and red oil in HF. The HF removed by line 105 is passed to storage drum 107. The concentrated solution is removed from column 43 by way of valved line 109 and passed to mixer 111.

The red oil content of the catalyst solution is controlled by using a hydrocarbon solvent to dissolve the red oil in the concentrated solution in mixer 111. The solvent is a hydrocarbon boiling above HF. The solvent acts to dissolve the red oil and to remove it from the HF—AgF solution. Heavy alkylate hydrocarbons are particularly suitable for use as the solvent. The quantity of solvent used to dissolve the red oil is dependent somewhat on the temperature of operation and on the oil content of the catalyst solution to be returned to reactor 21.

The solvent is passed from source 113 by way of valved line 115 and line 117 to mixer 111 and dissolves the red oil in the concentrated solution. The mixture of solvent and concentrated solution is withdrawn from mixer 111 by way of valved line 119 to recovery vessel 121 which is constructed of an upper zone 123 and lower zone 125. Internal reboiler 127 is in upper zone 123 and internal reboiler 129 is in lower zone 125. Most of the HF in the mixture of solvent and concentrated solution is removed by way of overhead valved line 131 and passed to storage drum 107. Zones 123 and 125 are separated by perforated plate 128. The bottoms from zone 123 which are composed of red oil, solvent AgF and some HF are passed through perforated plate 128 into zone 125. The remaining HF is removed as a vapor through plate 128 to zone 123. The solvent and dissolved red oil are decanted from the AgF and removed from zone 125 by way of valved line 133, and line 135. The bottoms from zone 125 which are a slurry of AgF and solvent are removed by way of valved line 137 and passed to mixer 139. Liquid HF is introduced into mixer 139 from storage drum 107 by way of valved line 141 and dissolves the AgF in the slurry. The mixture of solvent and HF—AgF solution is removed from mixer 139 by way of line 143 and passed to settler 145 and separates into an upper solvent phase and a lower HF—AgF solution phase. The solvent phase is removed by valved line 147. This solvent stream may be reused and is then passed by way of valved line 149 to line 117 and mixer 111. However it is preferred to discard this solvent stream and it is then passed by way of valved line 151 and removed from the process by way of line 135. The lower HF—AgF solution is removed from settler 145 by way of valved line 153 and passed by way of lines 61 and 37 to reactor 21. Make up AgF to replace that lost in the process is passed from source 155 by way of valved line 157 to the HF—AgF solution in valved line 153.

EXAMPLES

The beneficial effect on octane number of the alkylate product by the addition of silver fluoride to the HF catalyst is shown by the data listed in Table I below. Runs 2, 3, and 4 are illustrative of the invention. Run 1 shows typical results using HF catalyst in an alkylation process. In each of these runs the alkylation reaction was carried out in a one liter Hastelloy autoclave having a cooling jacket and 1100 r.p.m. propeller stirrer. In each run, 250 grams of isobutane which was 99 percent pure was charged to the autoclave. In addition 250 grams of liquid hydrogen fluoride, which was 99.6 percent pure and the remainder water, was charged to the reactor. In runs 2, 3, and 4 silver fluoride which was CP grade was charged to the autoclave. Run 1 used no silver fluoride in order to illustrate the results with only hydrogen fluoride as the catalyst.

The temperature of the autoclave was brought to 77° F. Agitation of the contents of the autoclave was started using the stirrer. Olefin was then introduced into the intermingled contents of the autoclave at the rate of one ml. per minute, until the desired amount of olefin had been charged to the autoclave. Upon completion of the addition of the olefin the agitation of the contents was stopped and the contents allowed to settle from 10–15 minutes. Throughout the runs, sufficient pressure was used to keep the hydrocarbons and HF liquid.

A liquid hydrocarbon phase and a liquid HF—AgF were separately withdrawn from the autoclave. The hydrocarbon phase was washed with caustic to remove entrained HF and then washed with water to remove any remaining caustic in the hydrocarbons. The $C_5$–$C_8$ fraction of the alkylate product was analyzed using gas chromatography. The $C_9+$ fraction of the alkylate product was obtained using distillation. The CFR–R (ASTM research) octane number of the clear $C_5$–$C_8$ fraction of the alkylate product was obtained using the Micro-Method.

Table 1

| Run No. | 1 | 2 | 3 | 4 |
|---|---|---|---|---|
| Temperature, °F | 77 | 77 | 77 | 77 |
| Feed: | | | | |
| Isobutane, g | 250 | 250 | 250 | 250 |
| Butene-2, ml | 70 | 70 | 70 | 0 |
| Butene-1, ml | 0 | 0 | 0 | 60 |
| HF, g | 250 | 250 | 250 | 250 |
| Wt. percent AgF on HF | 0 | 4.8 | 10.0 | 10.0 |
| Alkylate Product ($C_5$–$C_8$): | | | | |
| Percent $C_5$–$C_7$ | 6.3 | 3.5 | 3.4 | 4.7 |
| Percent $C_8$— | 79.7 | 83.2 | 88.0 | 77.0 |
| Trimethylpentanes | 13.9 | 13.2 | 8.7 | 18.3 |
| Dimethylhexanes | 93.6 | 96.4 | 96.7 | 95.3 |
| Percent $C_8$ in Alkylate | 99.9 | 99.9 | 100.1 | 100.0 |
| Total | 4.4 | 3.1 | | |
| Percent $C_9+$ in total alkylate | 96.0 | 97.8 | 99.3 | 95.0 |
| Octane No., CFR–R Clear ($C_5$–$C_8$ product) | | | | |

The results of Runs 1 through 4 are listed in the annexed Table I.

As can be seen from Table I, the octane number of the $C_5$–$C_8$ fraction of the alkylate product was increased with the addition of AgF to the HF catalyst, in the comparable runs 1, 2, and 3. Butene-2 was used as the olefin feed in runs 1, 2, and 3.

The octane number of run 4 which used butene-1 as the olefin feed was lower than that of run 1 which used butene-2 as the olefin feed. It is known that HF alone under these conditions produces lower octane number alkylate from butene-1 than from butene-2; even with butene-1 feed the modified catalyst gives a higher octane number than HF alone.

Thus having described the invention what is claimed is:

1. A paraffin alkylation process which comprises: contacting a liquid feed hydrocarbon comprising isoparaffins having 4–5 carbon atoms and olefins having 3–5 carbon atoms, said isoparaffins and said olefins being present in a mole ratio of isoparaffins to olefins of at least 2, with a liquid substantially anhydrous hydrogen fluoride catalyst containing dissolved silver fluoride in an amount of about 2–15 parts by weight per 100 parts by weight of said hydrogen fluoride, said catalyst solution and said feed being present in a volume ratio of at least 0.6, said contacting being carried out at a temperature on the order of 30°–130° F., and said contacting continuing for a time sufficient to obtain an alkylate product.

2. The process of claim 1 wherein said isoparaffin is isobutane.

3. The process of claim 1 wherein said olefin is butene-2.

4. The process of claim 1 wherein said feed hydrocarbon is a refinery butane-butylene stream.

5. The process of claim 1 wherein said silver fluoride is present in an amount of about 5–12 parts by weight per 100 parts by weight of said hydrogen fluoride catalyst.

6. The process of claim 1 wherein said ratio of catalyst solution to said feed hydrocarbon is about 1–3.

7. The process of claim 1 wherein said temperature is in the order of 60°–80° F.

8. A process for producing paraffin alkylate which process comprises: (1) contacting in the liquid state a hydrocarbon feed comprising isoparaffins having from 4 to 5 carbon atoms and olefins having from 3 to 5 carbon atoms, said isoparaffins being present in a mole ratio to said olefins of at least 2, in the presence of a liquid substantially anhydrous hydrogen fluoride catalyst containing dissolved silver fluoride in an amount of about from 2 parts to 15 parts by weight per 100 parts by weight of said hydrogen fluoride, said catalyst solution and said feed being present in a volume ratio of at least 6 parts of said catalyst per 10 parts of said feed, said contacting being carried out at a temperature of about 30°–130° F. and for a sufficient time to obtain an alkylate product; and (2) separating a hydrocarbon phase including said alkylate product from a catalyst phase.

9. A paraffin alkylation process which comprises: (1) contacting a liquid feed hydrocarbon comprising isobutane and olefins containing 4 carbon atoms, said isobutane and said olefins being present in an external mole ratio of isoparaffins to olefins of about 4–10, with a liquid substantially anhydrous hydrogen fluoride catalyst containing dissolved silver fluoride in an amount of about 5–12 parts by weight per 100 parts by weight of said hydrogen fluoride, said catalyst solution and said feed being present in a volume ratio of about 1–3, said contacting being carried out at a temperature on the order of 60°–80° F. and for a time to substantially convert all of the olefin to alkylate; (2) separating a liquid hydrocarbon phase containing alkylate product from a liquid catalyst phase; and (3) recovering said alkylate product from said hydrocarbon phase.

10. The process of claim 9 wherein said silver fluoride is present in an amount of about 9 parts by weight per 100 parts by weight of said hydrogen fluoride.

11. The process of claim 9 wherein said olefin is butene-2.

No references cited.